(12) United States Patent  
Ross

(10) Patent No.: US 6,550,568 B2
(45) Date of Patent: Apr. 22, 2003

(54) COLUMN ASSIST ISOLATION SYSTEM

(75) Inventor: Kevin C. Ross, Hemlock, MI (US)

(73) Assignee: Delphi Technologies, Inc., Troy, MI (US)

( * ) Notice: Subject to any disclaimer, the term of this patent is extended or adjusted under 35 U.S.C. 154(b) by 38 days.

(21) Appl. No.: 09/867,298

(22) Filed: May 29, 2001

(65) Prior Publication Data

US 2002/0179361 A1 Dec. 5, 2002

(51) Int. Cl.[7] .................................................. F16H 1/16
(52) U.S. Cl. ................................. 180/444; 74/388 PS
(58) Field of Search .............................. 180/443, 444, 180/446; 74/574, 388 PS

(56) References Cited

U.S. PATENT DOCUMENTS

| 4,269,043 A | * | 5/1981 | Kizu et al. ................. 64/11 R |
| 4,667,759 A | * | 5/1987 | Hasimoto et al. .......... 180/79.1 |
| 4,671,371 A | * | 6/1987 | Shimizu .................... 180/79.1 |
| 5,259,818 A | * | 11/1993 | Kachi et al. ................ 464/89 |
| 5,738,183 A | * | 4/1998 | Nakajima et al. ........... 180/444 |
| 5,878,832 A | * | 3/1999 | Olgren et al. ............... 180/444 |
| 6,044,723 A | * | 4/2000 | Eda et al. ................. 74/388 PS |
| 6,068,555 A | * | 5/2000 | Andra et al. ................. 464/93 |
| 6,364,049 B1 | * | 4/2002 | Iwasaki et al. ............. 180/444 |
| 6,378,647 B1 | * | 4/2002 | Birsching et al. .......... 180/444 |
| 6,412,591 B1 | * | 7/2002 | Endo et al. ................. 180/427 |

* cited by examiner

Primary Examiner—Lesley D. Morris
Assistant Examiner—Tony Winner
(74) Attorney, Agent, or Firm—Edmund P. Anderson

(57) ABSTRACT

A method and apparatus for reducing rattle in a column mounted electric power steering system. A method of reducing audible noise in a steering system, generated by road impact energy and transmitted through a transmission medium, which includes a column mounted electric power steering system, including interrupting the transmission medium; and absorbing the road impact energy through the steering system. A column assist isolation system includes a sleeve disposed at a housing of an electric power steering system, a first bushing disposed at a first end of the sleeve, and a second bushing disposed at a second end of the sleeve. Both the first bushing and the second bushing include a compliant material.

10 Claims, 3 Drawing Sheets

COLUMN ASSIST ISOLATION SYSTEM

BACKGROUND

Certain motor vehicles contain column-type electric power steering systems. The electric power steering system provides torque assist to the steering shaft of a vehicle via an electric motor and a worm/worm gear reduction mechanism. The worm/worm gear reduction mechanism is interposed between the output shaft and the motor to obtain an appropriate steering speed as well as sufficient steering assistance in the course of transmission of the rotational force from the motor to the output shaft.

When the motor vehicle is traveling over a less-than-smooth road surface, a certain amount of road impact energy is created at the points at which the steerable wheels contact the road surface. The road impact energy travels through the tires, wheels and linkage, through the rack and pinion gear, and through the column mounted electric power steering system. The road impact energy causes high bi-directional acceleration of system components, which creates audible noise, commonly known as rattle. While not indicative of a defect in the system, such rattle oftentimes proves to be an annoyance to the occupants of the motor vehicle.

SUMMARY

A method and apparatus for reducing rattle and increasing road feel at a steerable wheel in a vehicle. When road impact energy is transmitted through a transmission medium, which includes a column mounted electric power steering system, an audible noise may be generated throughout a steering system of a vehicle. Interrupting the transmission medium and absorbing the road impact energy through the steering system reduces the audible noise in the steering system and increases the road feel at the steerable wheel of the vehicle.

A column assist isolation system includes a sleeve disposed at a housing of an electric power steering system, a first bushing disposed at a first end of the sleeve, and a second bushing disposed at a second end of the sleeve. Both the first bushing and the second bushing include compliant materials.

BRIEF DESCRIPTION OF THE DRAWINGS

Referring now to the drawings wherein like elements are numbered alike in the several Figures.

DETAILED DESCRIPTION

A column assist isolation system can be mounted on any type of column mounted electric power steering (EPS) system. Column mounted EPS systems generally includes shafts, gears, and other components that connect the steerable wheels to the steering device of a vehicle. These components, also known as a transmission medium, have certain material and engagement characteristics that allow vibration to cause audible noise and to be transmitted throughout the steering system and heard by the occupants of the vehicle. The column assist isolation system absorbs, reflects, and dissipates vibration at the transmission medium that occurs due to the road impact energy. Absorbing, reflecting, and dissipating vibration at the transmission medium reduces the noise throughout the transmission medium. In addition, the column assist isolation system enhances the steering feel at the steering device of a vehicle in which the system is installed. Moreover, the functionality of the column assist isolation system is the same regardless of the type of column mounted EPS system. For this reason, the column assist isolation system can be applied by one of ordinary skill in the art to any column mounted EPS system.

Figure 1:
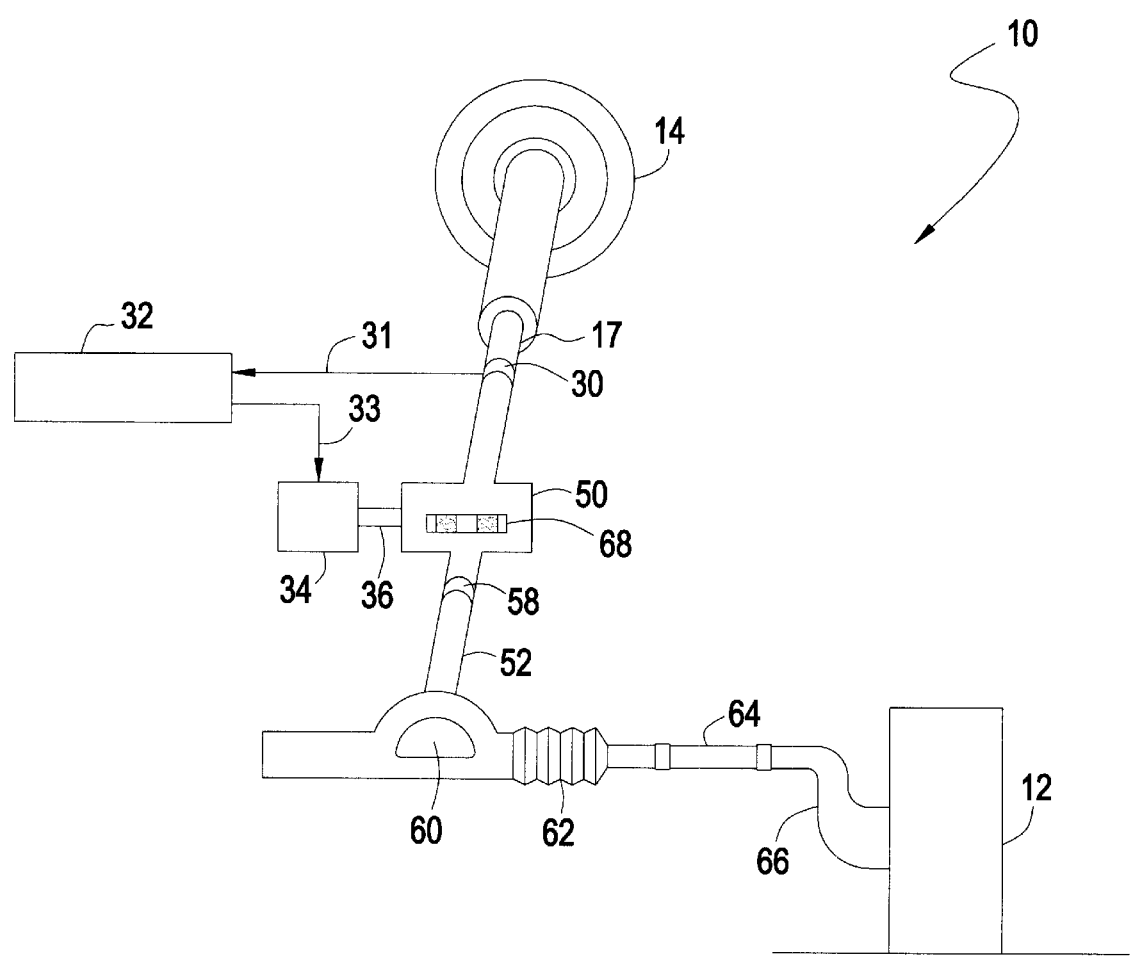
FIG. 1 is a schematic view of a steering system of a vehicle.

Before describing the column assist isolation system, a steering system is described so that the column assist isolation system can be placed in context. Referring to FIG. 1, one type of column mounted EPS system incorporable into a motor vehicle is shown generally at 10 and is hereinafter referred to as "steering system 10". Steering system 10 alters the direction of travel of a motor vehicle (not shown) in response to an input from an operator of the motor vehicle, a sensor disposed in the motor vehicle, or a combination thereof. Such a response ultimately changes the angle of the steerable wheels of the motor vehicle while the motor vehicle is traveling. By changing the angle of the steerable wheels while the motor vehicle is traveling, a change in the direction of travel can be effectuated.

Steering system 10 comprises a steering device 14, which is accessible by an operator (not shown) of the motor vehicle and is disposed on a steering shaft 17. The rotational force of steering device 14 is transmitted to steering shaft 17, and is detected by a torque sensor 30 disposed thereon. Torque sensor 30 measures the torque exerted on steering shaft 17 in axial directions and transmits a signal 31 to a controller 32. Controller 32 then transmits an output signal 33 to a motor 34 to initiate the operation of motor 34. Motor 34 is in operable communication with a worm shaft 36 so that motor 34 drives worm shaft 36.

Worm shaft 36 axially rotates, which causes worm 38 (shown on FIG. 2) to rotate. Worm 38 meshes with worm gear 26, which rotates when worm 38 rotates. Worm gear 26 provides turning assistance to steering shaft 17. As steering shaft 17 axially rotates, intermediate shaft 52 disposed in mechanical communication with a coupling joint 58 rotates a pinion gear (not shown) located under a gear housing 60. Coupling joint 58 may be a universal joint, as shown, or a torsional member. Rotation of the pinion gear (not shown), which is located in a housing 60, moves a rack 62, which moves tie rods 64 (only one shown). When tie rods 64 move, they turn steering knuckles 66 (only one shown), which turn steerable wheels 12 (only one shown).

Figure 2:
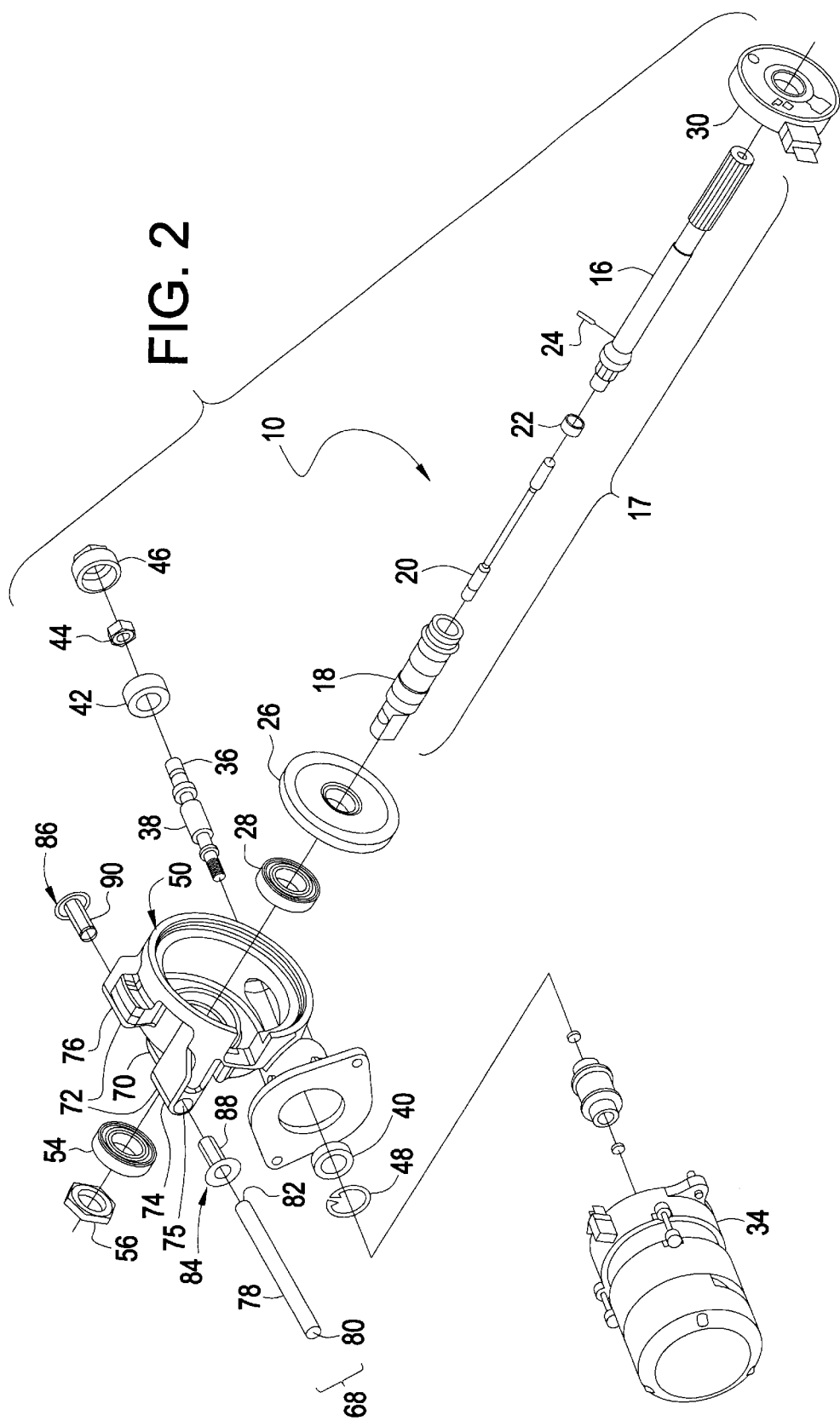
FIG. 2 is an exploded view of an EPS system with column assist isolation system.

Referring now to FIG. 2, steering shaft 17 is shown in greater detail. Steering shaft 17 comprises an upper shaft 16, which is in operable communication with a lower shaft 18 through a torsion bar 20. Needle bearing 22 and pin 24 support torsion bar 20 and are located at the connection between torsion bar 20 and upper shaft 16. A worm gear 26 is in operable communication with lower shaft 18. A bearing 28 supports lower shaft 18 at worm gear 26.

A worm 38 is connected to a worm shaft 36. Worm shaft 36 is supported by two bearings 40, 42. On one side of worm shaft 36, bearing 42 is pressed against worm 38 and axially retained by a nut 44 and a plug 46. On the opposite side of worm shaft 36, bearing 40 is pressed against worm 38 and axially supported by a retaining ring 48. Upon operation of motor 34, worm shaft 36 is driven and worm 38 and worm gear 26 correspondingly rotate to provide turning assistance to lower shaft 18.

Worm gear 26 may be contained in a housing 50. Lower shaft 18 extends through housing 50 and from a downside end 70 thereof to maintain operable communication with an intermediate shaft (not shown). A bearing 54 supports housing 50 at lower shaft 18 and is axially secured by a nut 56.

A column assist isolation system 68 is mounted to downside end 70 of housing 50. Column assist isolation system 68 comprises a sleeve support 72, which may be either connected to housing 50 or molded as part of housing 50 that extends from downside end 70. Sleeve support 72 may be cylindrically shaped and comprises a first sleeve support 74 and a second sleeve support 76. Sleeve 78 is inserted through an opening 75 in first sleeve support 74 and inserted through an opening (not shown) in second sleeve support 76 so that a first end 80 of sleeve 78 is supported by first sleeve support 74 and a second end 82 of sleeve 78 is supported by second sleeve support 76.

First end 80 of sleeve 78 is retained at first sleeve support 74 by a first bushing 84. First bushing 84 is pressed onto first end 80 of sleeve 78 so that an elongated end 88 of first bushing 84 is pressed between first sleeve support 74 and sleeve 78. Second end 82 of sleeve 78 is retained at second sleeve support 76 by a second bushing 86. Second bushing 86 is pressed onto second end 82 of sleeve 78 so that an elongated end 90 of second bushing 86 is pressed between second sleeve support 76 and sleeve 78.

First bushing 84 and second bushing 86 are made of a material that has compliant properties. An example of such material is that the material could contain a certain amount of rubber or elastomer or be made completely from rubber or elastomer. First bushing 84 and second bushing 86 may also be formed from a wire mesh, or a steel wool material. In addition, spring washers would also be appropriate to provide the compliant properties. Moreover, other materials may also be used so long as such materials have compliant properties. Sleeve 78 does not need to be any special material, however, a hard material is preferable. For instance, materials such as wood, plastic, or steel are examples of materials that could be used for sleeve 78.

Figure 3:
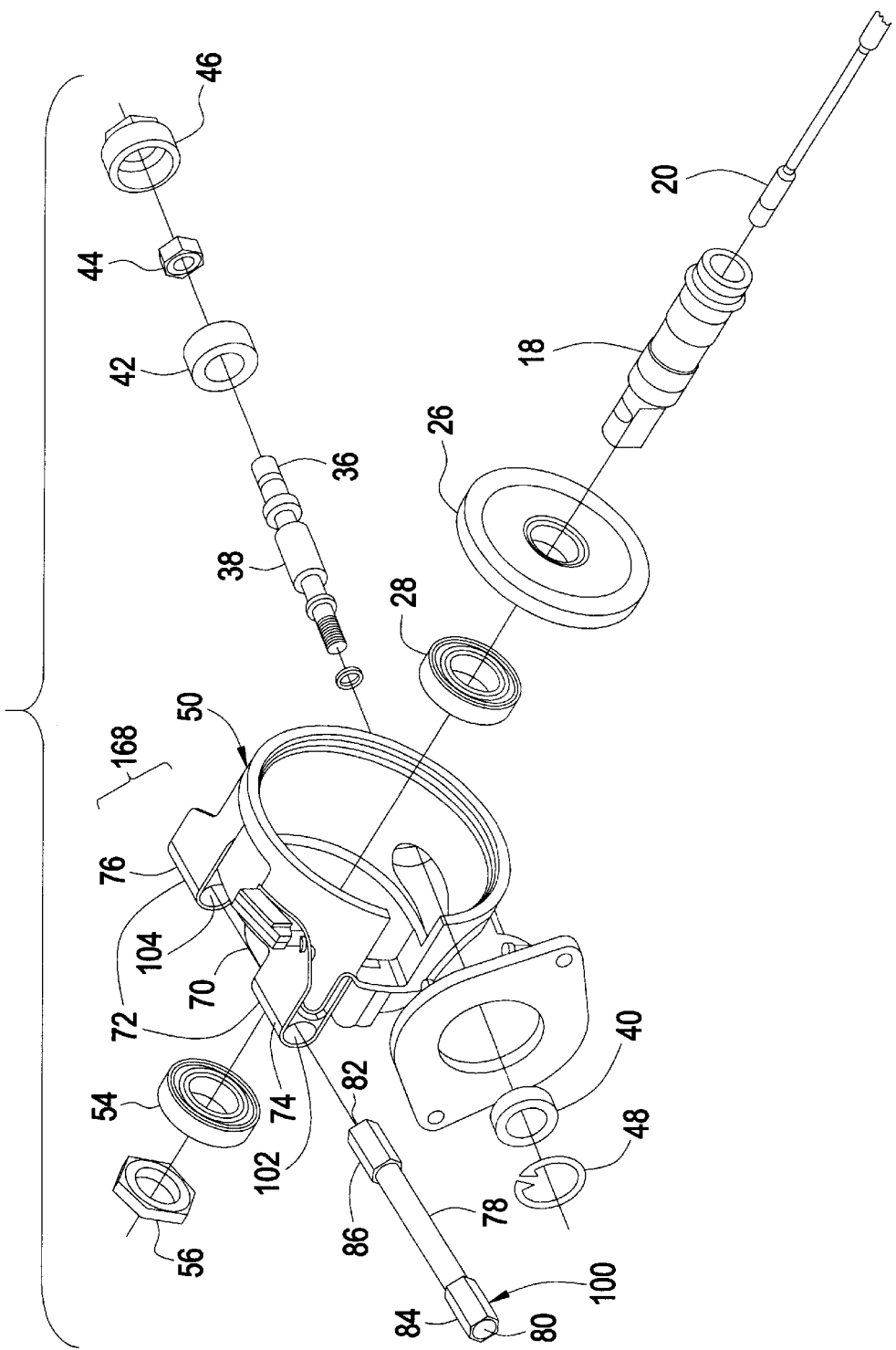
FIG. 3 is an exploded view of an alternative embodiment EPS system with column assist isolation system.

Referring to FIG. 3, another embodiment of column assist isolation system is shown generally at 168. First bushing 84 is fixably attached to first end 80 of sleeve 78 and second bushing 86 is fixably attached to second end 82 of sleeve 78, which together form a bushing/sleeve unit 100. Downside end 70 of housing 50 comprises a sleeve support 72, as described above with reference to FIG. 2, but which also comprises an open slot 102 located at first sleeve support 74 and an open slot 104 located at second sleeve support 76. Open slots 102, 104 are sized so as to allow bushing/sleeve unit 100 to be pressed into and retained at first sleeve support 74 and second sleeve support 76.

Referring to both FIGS. 2 and 3, the placement of the sleeve and the bushings at the downside end of the housing effectively reduces the rattle experienced by the steering system. Such a reduction in rattle is generally a function of the road impact energy being absorbed by the steering system. In addition, the column assist isolation system also adds torsional compliance to the EPS assist mechanism. The type of material employed for the bushings allow the bushings to compress slightly when the steering system undergoes torsional stress. The additional torsional compliance at the EPS assist mechanism allows the electric power steering assist mechanism to move slightly and allows the road impact energy to be felt by the driver through the steering shaft, thereby increasing the road feel at the steering device.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. An electric power assist steering system comprising:
   a steering shaft;
   an electric motor mounted proximate said steering shaft;
   a housing supporting said electric motor and said steering shaft;
   a gearing mechanism within said housing, said gearing mechanism placing said electric motor and said steering shaft in mechanical communication with one another;
   a sleeve support fixed to an exterior of said housing;
   a sleeve extending through said sleeve support;
   a compliant bushing disposed between said sleeve and said sleeve support for reducing rattle;
   said sleeve support comprising a first sleeve support having a first hole and a second sleeve support having a second hole, said first hole and said second hole being coaxial, said sleeve extending through said first hole and second hole; wherein said sleeve has a first end and a second end, said first end being supported in said first hole by said compliant bushing, and said second end being supported in said second hole by a second compliant bushing; wherein said sleeve support is positioned at the downside end of the housing; and
   wherein said sleeve, said compliant bushing, and said sleeve support allow the housing to move slightly in response to torsional stress in said steering system.

2. An electric power assist steering system comprising;
   a steering shaft;
   an electric motor mounted proximate said steering shaft;
   a housing supporting said electric motor and said steering shaft;
   a gearing mechanism within said housing, said gearing mechanism placing said electric motor and said steering shaft in mechanical communication with one another;
   a sleeve support fixed to an exterior of said housing;
   a sleeve extending through said sleeve support; and
   a compliant bushing disposed between said sleeve and said sleeve support for reducing rattle.

3. The electric power assist steering system of claim 2 wherein said gearing mechanism comprises a worm fixed to a shaft of said motor and a worm gear fixed to said steering shaft, said housing supporting said worm and said worm gear such that they are in mechanical engagement with one another.

4. The electric power assist steering system of claim 2 wherein said sleeve support is formed integrally with said housing.

5. The electric power assist steering system of claim 2, said sleeve support comprising a first sleeve support having a first hole and a second sleeve support having a second hole, said first hole and said second hole being coaxial, said sleeve extending through said first hole and second hole.

6. The electric power assist steering system of claim 5 wherein said sleeve has a first end and a second end, said first end being supported in said first hole by said compliant bushing, and said second end being supported in said second hole by a second compliant bushing.

7. The electric power assist steering system of claim 2 wherein said compliant bushing is formed from one of an elastomeric and rubber material.

8. The electric power assist steering system of claim 2 wherein said compliant bushing is attached to at least one end of said sleeve and is supported in a hole formed in said sleeve support.

9. The electric power assist steering system of claim 2 wherein said sleeve, said compliant bushing, and said sleeve support allow the housing to move slightly in response to torsional stress in said steering system.

10. The electric power assist steering system of claim 2 wherein said sleeve support is positioned at the downside end of the housing.

* * * * *